United States Patent
Kahana et al.

(10) Patent No.: US 8,635,498 B2
(45) Date of Patent: Jan. 21, 2014

(54) PERFORMANCE ANALYSIS OF APPLICATIONS

(75) Inventors: Chen Kahana, Gan Yavne (IL); Ruth Bernstein, Kiryat Ono (IL); Ifat Gavish, Yehud (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 372 days.

(21) Appl. No.: 13/123,702

(22) PCT Filed: Oct. 16, 2008

(86) PCT No.: PCT/US2008/080113
§ 371 (c)(1),
(2), (4) Date: Apr. 11, 2011

(87) PCT Pub. No.: WO2010/044797
PCT Pub. Date: Apr. 22, 2010

(65) Prior Publication Data
US 2011/0276836 A1    Nov. 10, 2011

(51) Int. Cl.
*G06F 11/00* (2006.01)
(52) U.S. Cl.
USPC .......................................................... 714/38.1
(58) Field of Classification Search
USPC .......................................................... 714/38.1
See application file for complete search history.

(56) References Cited

U.S. PATENT DOCUMENTS

| | | |
|---|---|---|
| 2004/0088400 A1 | 5/2004 | Daggett |
| 2008/0016412 A1 | 1/2008 | White et al. |
| 2008/0126413 A1 | 5/2008 | Addleman |
| 2008/0195369 A1 | 8/2008 | Duyanovich et al. |

FOREIGN PATENT DOCUMENTS

| | | |
|---|---|---|
| CN | 101233491 A | 7/2007 |
| KR | 20020004416 A | 1/2002 |
| KR | 20060063236 A | 6/2006 |
| KR | 20070080313 A | 8/2007 |
| WO | WO-0008806 A1 | 2/2000 |
| WO | WO-04001555 A2 | 12/2003 |

OTHER PUBLICATIONS

Korean Intellectual Property Office, International Search Report, Apr. 30, 2009, 3 pages, Daejeon, Republic of Korea.
European Patent Office, Supplemental Search Report, Apr. 20, 2012, 6 pages, Munich, Germany.

*Primary Examiner* — Bryce Bonzo

(57) ABSTRACT

Embodiments of methods and systems for analyzing performance of an application are provided. In that regard, an embodiment of a method for analyzing performance, among others, comprises collecting performance metric data from the application over time; segmenting the performance metric data into time segments representing sets of contiguous time samples which exhibit similar performance metric behavior; determining the presence of an anomaly in a time segment; and correlating the anomalous segment with other data available to the system to determine the cause of the anomaly.

12 Claims, 3 Drawing Sheets

PERFORMANCE ANALYSIS OF APPLICATIONS

CROSS-REFERENCE TO RELATED APPLICATIONS

This application is related to co-pending U.S. patent application Ser. No. 12/243,262 (HP Disclosure No. 200800555), entitled "Segment-Based Technique and System for Detecting Performance Anomalies and Changes for a Computer-Based Service", by Mehmet K. Ozonat, filed on Oct. 1, 2008, which is herein incorporated by reference in its entirety.

BACKGROUND

Anomalies in performance metric behavior of a large-scale distributed web service may be symptoms of service problems that may lead to loss of revenue for the web service provider and reduced satisfaction of service users. Accurate detection of anomalies in performance metric behavior can affect correct diagnosis, recovery, and minimizing the impact of service problems. Both online detection (e.g., real time detection of anomalies as metric measurements are taken) and offline detection (e.g., detection of anomalies in stored measurements indicating changes in past behavior or recurring problems) may be used to discover and address service problems.

Performance metrics, such as response time or throughput, may be sampled at regularly-spaced time intervals by information technology (IT) management tools. Some IT management tools detect performance anomalies by setting thresholds for various performance metrics, e.g., an anomaly is detected when a performance metric exceeds or falls below a designated threshold. In some cases, an alarm may be generated when a performance metric either exceeds an upper threshold or falls below a lower threshold.

Performance management tools that employ threshold-based anomaly detection techniques can result in false alarms. In some situations, a performance metric may exceed its threshold in the absence of any major service problems. For example, a metric with a threshold set at the 99th percentile of its historical values is expected to exceed the threshold approximately once in every 100 time samples even in the absence of any service problems, generating a false alarm. However, a threshold-based approach may not provide a global view of detected anomalies, such as whether the performance anomaly is an isolated event or the result of a larger pattern.

BRIEF DESCRIPTION OF THE DRAWINGS

Embodiments of the invention will now be described with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
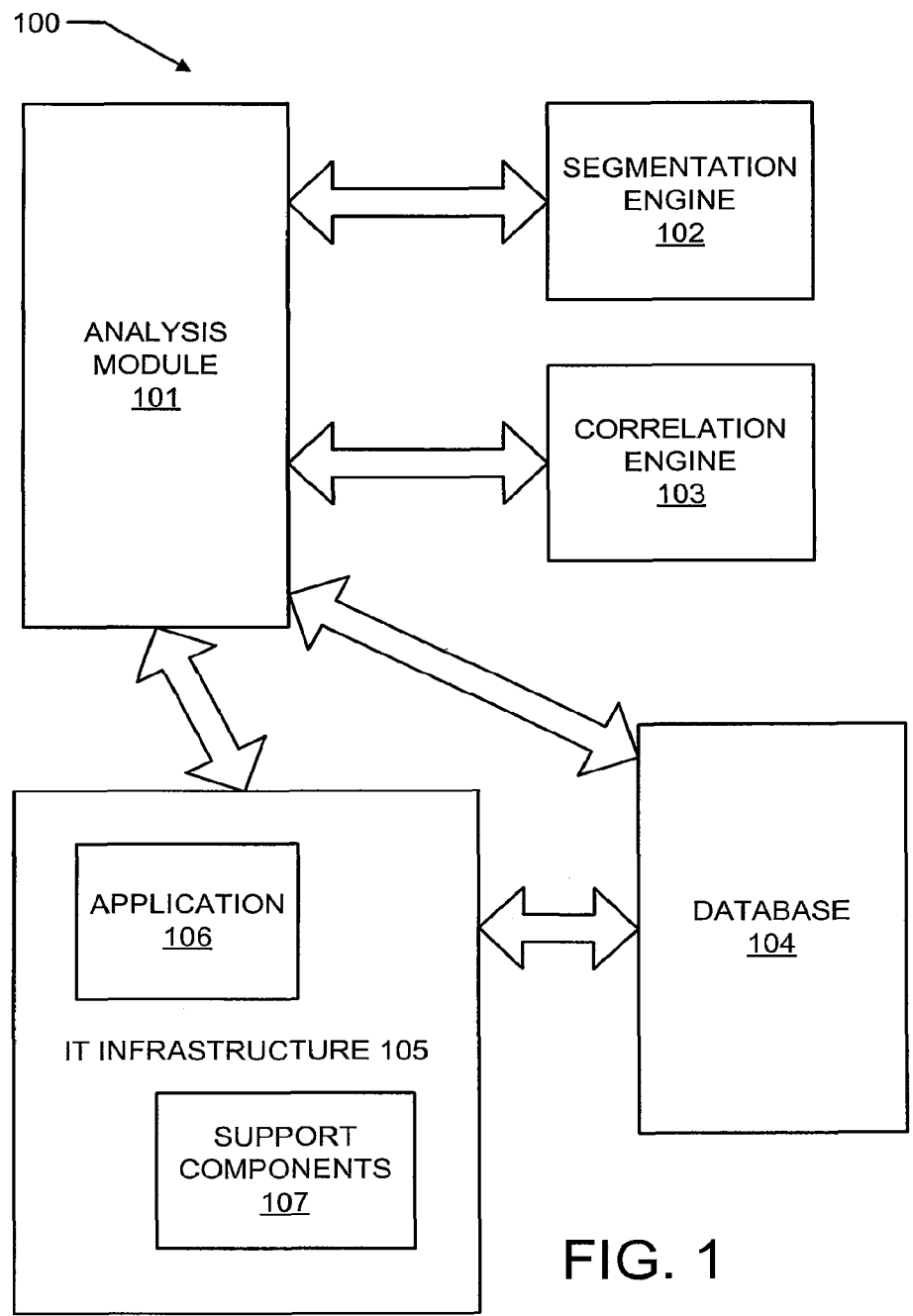
FIG. 1 is an illustration of an analysis system in accordance with one embodiment of the present disclosure.

Briefly described, one embodiment, among others, comprises a method for analyzing performance of an application. The method comprises collecting performance metric data from the application over time; segmenting the performance metric data into time segments representing sets of contiguous time samples which exhibit similar performance metric behaviour; determining the presence of an anomaly in a time segment; and correlating the anomalous segment with other data available to the system to determine the cause of the anomaly.

Another embodiment, among others, comprises a computer readable storage medium comprising a program for analyzing performance of an application. The program when executed by a computer processor causing the processor to perform the steps of: collecting performance metric data from the application; segmenting the performance metric data into time segments; determining the presence of an anomaly in a time segment; and correlating the performance metric data to determine the cause of the anomaly.

Another embodiment, among others, comprises a system for analyzing performance of an application. The system comprises an analysis module configured to collect performance metric data from the application, the analysis module further configured to identify an anomaly in one or more of time segments of the collected performance metric data; a segmentation engine configured to segment the collected performance metric data into time segments; and a correlation engine configured to determine a cause of the identified anomaly.

Other systems, methods, features, and advantages of the present disclosure will be or become apparent to one with skill in the art upon examination of the following drawings and detailed description. It is intended that all such additional systems, methods, features, and advantages be included within this description, be within the scope of the present invention, and be protected by the accompanying claims.

A threshold-based approach may not provide a global view of detected anomalies. When a performance anomaly is detected, an administrator may need to know if the anomaly is isolated in time, if it is part of a larger anomalous time period, or how the performance metrics change throughout the course of an anomalous time period (e.g., a period with higher than normal response times). Further, in a system with multiple metrics, there may be strong dependencies between a subset of the performance metrics, such as, for example, response times of two interrelated software applications. Thus, an anomaly decision (e.g., identification of an anomaly, such as, for example, a response time that exceeds a threshold) may be based on the metric data in the joint subset rather than individually, requiring the setting of rules based on various metrics. Formulating a rule that gives accurate anomaly decisions may be a challenging task for an administrator even in the case of only a few metrics.

In addition, performance metrics may exhibit multimodal behavior, e.g., multiple normal performance behaviors. If multimodal behavior is due to, for example, daily or weekly periodic effects, different thresholds for the performance metrics may be set based on the time of the day or week. However, multimodal behavior may also be due to non-periodic effects, such as service maintenance. Thus, in a large-scale service distributed across multiple data centers and geographies, there may be hundreds to thousands of non-periodic effects every week.

Embodiments of the present disclosure may continuously monitor an application, collect performance metric data (also referred to herein as "metrics") from the application, and analyze the metric data to determine the behavior of the application. The application may be any portion of a business' IT infrastructure, including software or hardware. Some examples of performance metrics that may be collected can include, but are not limited to, response time of the application, number of unavailabilities per unit of time (unavailabilities may include, for example, errors, timeouts, or any time the application is unable to process a user's request), throughput, hits per second, or size of a log file. Any metric that describes the behavior of the application may be collected and analyzed. Through analysis, anomalies may be detected proactively in the behavior of the application even if no threshold has been crossed. Detected anomalies may also be isolated to pinpoint the root cause of an anomaly in order to prevent the anomaly from escalating and impacting the business. Embodiments of a proactive analysis system may be used in conjunction with Hewlett Packard's Business Availability Center (BAC) software for managing availability and performance of business services and applications, although not limited to such environments and/or platforms.

FIG. 1 shows an embodiment of an analysis system 100 comprising an analysis module 110. Analysis module 110 monitors and collects metric data from application 160. Application 160 may be any IT component that is used in, for example, a business that an administrator wishes to monitor. Embodiments of application 160 may comprise both software and hardware components, or may comprise only software. Application 160 is part of IT infrastructure 150, and is supported by support components 170. Support components 170 may be any portion of IT infrastructure 150 that interact with application 160. While a single block is shown for support components 170 of FIG. 1, this is for illustrative purposes only. Support components 170 may include any number of software and hardware components. In addition, IT infrastructure 150, including application 160 and support components 170, may include any computer software and hardware that are used in, for example, a business. Database 140 includes information regarding relationships between elements that make up IT infrastructure 150, including relationships between application 160 and support components 170. Analysis module 110 communicates with segmentation engine 120 and correlation engine 130. Segmentation engine 120 segments the metric data into sets of contiguous time samples which exhibit similar performance metric behaviour using, for example, information theoretic and statistical learning techniques.

Correlation engine 130 correlates the segments with other time-based data available in the system to pinpoint the root cause of an anomaly. In doing so, analysis module 110 may query database 140. The functionality and interactions of the various elements of analysis system 100 are discussed in further detail below with regards to FIG. 2 and FIG. 3.

Figure 2:
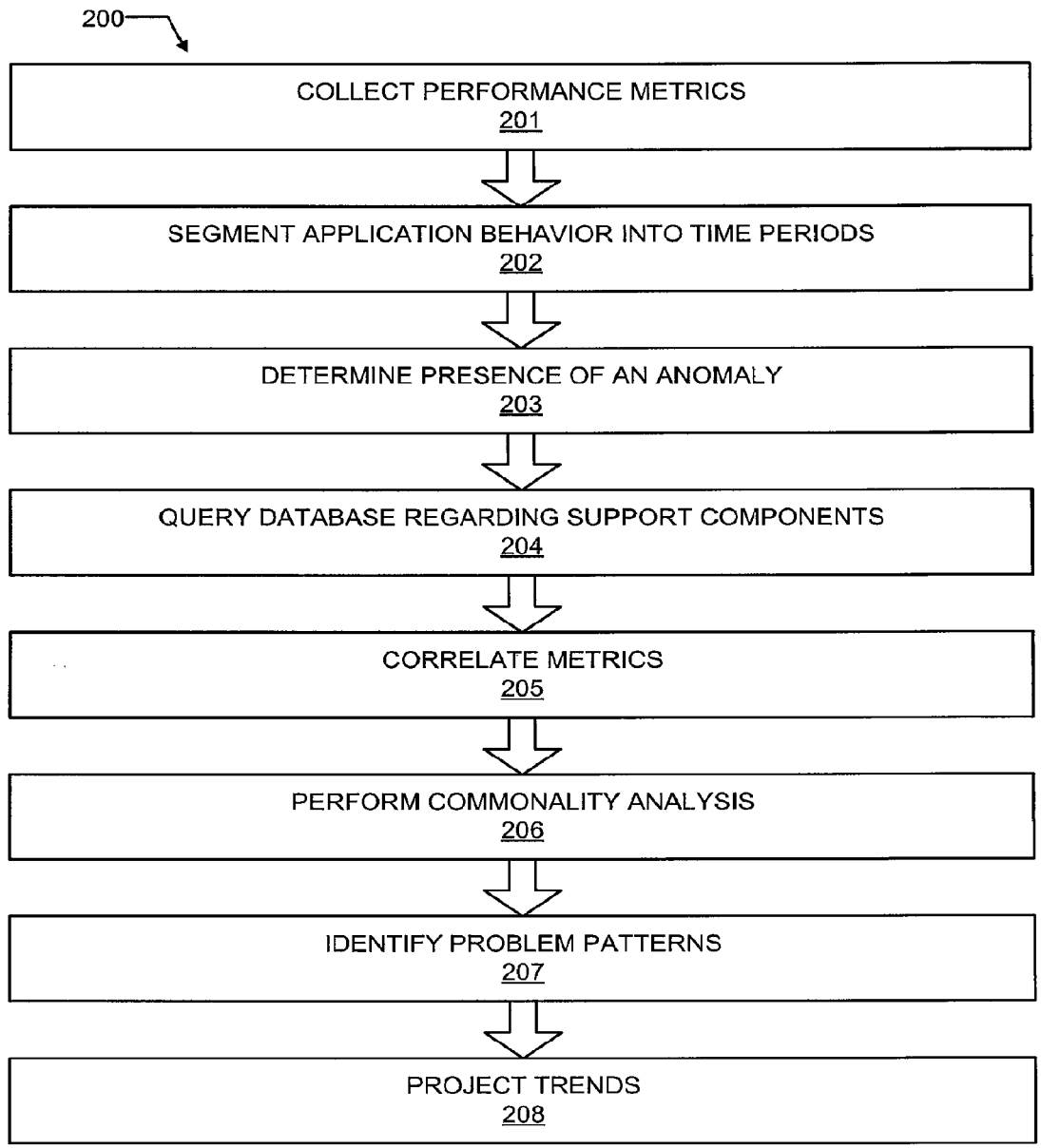
FIG. 2 is a flowchart illustrating an exemplary embodiment of an analysis method implemented in the analysis system of FIG. 1 in accordance with one embodiment of the present disclosure.

Referring to FIG. 2, an exemplary embodiment of an analysis method 200 is illustrated, beginning with analysis module 110 collecting performance metrics from application 160 in block 210. Segmentation engine 120 then segments the performance metric data collected from application 160 into time segments using, for example, a statistical learning algorithm in block 220. Each segment may relate to a period of different behavior seen in the performance metrics gathered from application 160. The metric data may be collected passively by monitoring users' interactions with the application, or may be collected by an agent acting as a user.

In some non-limiting embodiments, segments may be modeled using a parametric, Gaussian mixture distribution, where each component of the mixture represents a segment. Locations of segments (i.e., the time sample when a segment starts or ends) and the segment characteristics (i.e., the statistical character of the segments such as, but not limited to, mean vectors and covariance matrices) may be discovered by minimizing a statistical distance between the true, unknown distribution of the metrics and a Gaussian mixture model. The distance is also known as mismatch in information theory. Segments may be discovered offline (e.g., from historical data) or online (e.g., from recent measured metrics). In some embodiments, a predetermined threshold may be used to determine when a segment is discovered. Further details of embodiments of a suitable thresholdless segmentation system of the above-type are described in co-pending U.S. patent application Ser. No. 12/243,262 (HP Disclosure No. 200800555), by Mehmet K. Ozonat, filed on Oct. 1, 2008, which is herein incorporated by reference in its entirety, although other segmentation algorithms may be used.

In block 230, analysis module 110 determines whether a specific time segment exhibits an anomaly 160; the details of an embodiment of an anomaly determination method are discussed below with regard to FIG. 3. Examples of how anomalous behavior may be exhibited or manifested include, but are not limited to: a static or dynamic threshold for one or more metrics is crossed; availability problems, such as errors or timeouts; or an increase in response time in the segment under analysis over a previous time segment.

Once an anomalous segment is identified in block 230, in block 240 database 140 is queried regarding support components 170 of application 160. Database 140 stores the state of IT infrastructure 150, including the relationships between the various components that make up the IT infrastructure 150. The database 140 may be, for instance, a Configuration Management Database (CMDB). A CMDB stores the relationships between the various parts of IT infrastructure 150 including applications and business services, as well as any changes that may have been made to IT infrastructure 150. In some implementations, the CMDB can include a rich data model including both physical elements such as, but not limited to, servers, network, storage and software, and logical elements such as, but not limited to, business services, virtual private networks, end users and service level agreements. In some embodiments, the data model may be populated and maintained through dependency mapping software. Correlation engine 130 then correlates the metrics of the support components 170 with the performance metrics of application 160 to filter out symptoms and pinpoint the root cause of the anomaly in block 250. In one embodiment, the metric data of the support components 170 are stored in database 140. In other embodiments, the metric data may be stored in a separate database (not shown in FIG. 1). In some embodiments, an identifier (ID) may be utilized to link the monitoring of the analysis module 110 to the database. If there is a strong correlation between the metrics of a particular supporting component and application 160 during an anomalous period, the particular supporting component is likely the cause of the anomaly. The correlation engine 130 may utilize statistical induction techniques and probabilistic models as a basis for automated decision making, management and control of complex IT systems; however, any appropriate method of metric correlation may be used. Examples of metric correlation systems can be found in U.S. Patent Publication No.

2007/0083513 to Cohen et al.; U.S. Pat. No. 7,194,935 to Cohen et al.; and U.S. Patent Publication No. 2006/0188011 to Goldszmidt et al.;

In one embodiment, among others, signatures are created from collected metric data. For example, raw values of measured metrics may be combined to form a signature. A signature may be provided for each time interval. The signature and a corresponding annotation associated with an identified problem are stored in a database. Subsequent signatures may be compared to stored signatures using a clustering algorithm. Potential problems may be determined from the annotations of the similar signatures.

In another embodiment, measured metric data is placed in vectors. The vectors may then be synchronized and characterized by relationships with service level objectives (SLOs). Key metrics that have been identified may be used to generate models indicative of SLO states. Subsequent measured metrics are compared to the generated models to determine which SLO state most closely fits.

In block 260, commonality analysis is performed by analysis module 110 to relate the identified anomaly to past anomalies, using past anomalies as a knowledge base to identify the cause of the identified anomaly. In one embodiment, among others, the past anomalies (or anomalous segments) may be stored in a separate database. Similarities between the identified anomalous segment and past anomalous segments may indicate that the cause of the identified anomaly is the same as a past anomaly. Some anomalies may be periodic or recurring in time, have similar signatures, share similar application errors, or occur from same locations; similar anomalies may have the same root cause. Analysis module 110 identifies problem patterns, such as scalability or load balancing problem patterns, and classifies the anomaly into a category of anomalies based on the identified patterns in block 270. In one embodiment, the analysis module 110 includes a feedback stage, which learns about an organization's problems, correlates the problems to problem patterns, and uses the identified patterns to identify and classify future problems. In some embodiments, patterns may be generic and relevant to all organizations, e.g., scalability problems where the number of concurrent users may impact application performance. In other embodiments, learning is used to identify problems specific to an organization. For example, learning may adapt a generic solution to the organizations' specific problems. An anomaly may signal a buildup period to a larger anomaly, which may be recognized by comparison with past anomaly patterns. In block 280, the analysis module 110 projects trends in the patterns identified in block 270 and analyzes the trends over time to identify possible future problems.

Figure 3:
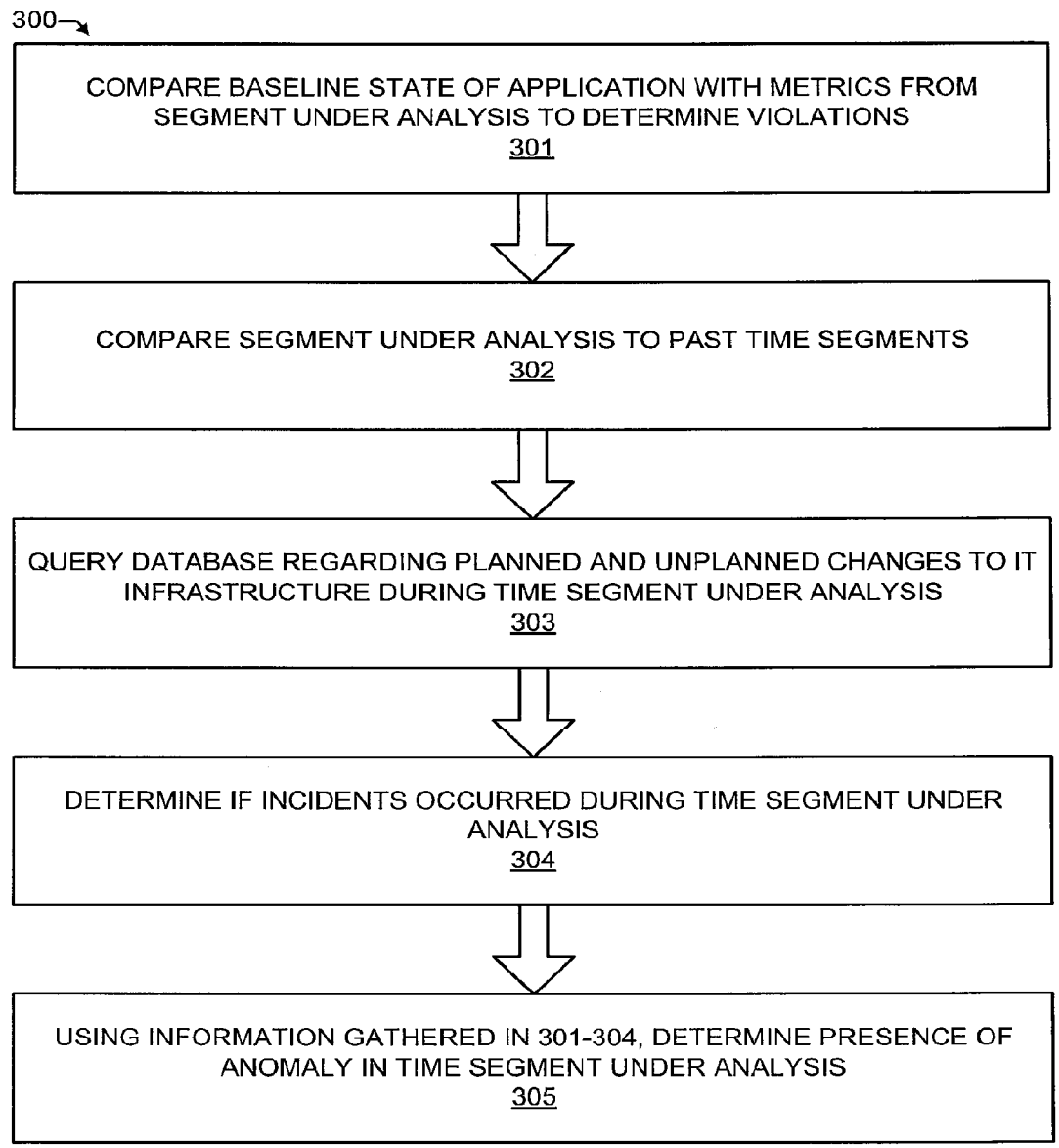
FIG. 3 is a flowchart illustrating an exemplary embodiment of a proactive anomaly determination method implemented in the analysis system of FIG. 1 in accordance with one embodiment of the present disclosure.

FIG. 3 is a flowchart illustrating an exemplary embodiment of a proactive anomalous segment determination method 300 implemented in the analysis system 100. The method 300 begins in block 310 by comparing a baseline state of application 160 with the metrics gathered during the time segment under analysis. The baseline may be calculated continuously from the measurements reported by the application and system monitors. In some embodiments, outliers, downtimes, and problems may be considered in the determination of normal behavior. In other embodiments, a sliding window may be utilized to consider changes in IT over time. A baseline may be stored in database 140 or in another separate database. Baselines may also be saved in an archive to provide a baseline history over time or deleted as they become non-relevant. A mathematical algorithm may be used to determine if there were violations in the segment, how many times the violations occurred, and the severity of the violations. In some embodiments, violations are determined based upon a calculated standard deviation. For example, if a measurement exceeds a predetermined multiple of the standard deviation from the normal behavior (or baseline), a violation is considered to have occurred. In one embodiment, among others, a standard deviation of three is considered as a threshold for learnt (baseline) behavior.

In block 320, the segment under analysis is compared to previous segments to see if deterioration in performance has occurred. Trends such as climbing or falling metric values are noted in this step, as they may herald the beginning of an anomaly. In block 330, database 140 is queried to determine if changes were made to application 160 or its support components 170 during the time segment under analysis. Any changes that were made are then correlated with Requests for Change (RFCs) listed in database 140 to determine if the changes were planned or unplanned. An RFC is a request for a future planned change to the IT infrastructure 150; if a change does not have a corresponding RFC, then the change was unplanned. Changes to IT infrastructure 150 may cause anomalous behavior in performance metrics. In block 340, further queries are made to database 140 determine if incidents occurred on the application or its infrastructure in the segment under analysis; the severity of the incidents may be considered. Incidents include entries (or tickets) as a result of a complaint from a user or opened automatically as a result of rules defined over the monitors. Lastly, in block 350, the analysis module 110 determines whether the segment under analysis contains an anomaly based on the information gathered in blocks 310-340.

Embodiments of an analysis system may identify anomalies before they become problems and impact the business by analyzing and projecting performance behavior. Retrieval of information from the database regarding the various portions of the IT infrastructure obviates the need for collaboration between different teams that support different portions of the IT infrastructure. Root cause analysis may be automated by using metric correlation and commonality analysis. Problem patterns may be used to classify anomalies into categories, allowing for identification of the root cause of an anomaly based on its classification.

The foregoing disclosure of embodiments of the present disclosure has been presented for purposes of illustration and description. It is not intended to be exhaustive or to limit the disclosure to the precise forms disclosed. Many variations and modifications of the embodiments described herein will be evident to one of ordinary skill in the art in light of the above disclosure. Note that the aforementioned examples are not meant to be limiting. Additional embodiments of systems and methods are also contemplated that may include many of the above-described features. Other systems, methods, features, and advantages of this disclosure will be or become apparent to one with skill in the art upon examination of the following drawings and detailed description. It is intended that all such additional systems, methods, features, and advantages be included within this description and be within the scope of the present disclosure.

Embodiments of the present disclosure can be implemented in hardware, software, firmware, or a combination thereof. In various embodiment(s), system components are implemented in software or firmware that is stored in a memory and that is executed by a suitable instruction execution system. If implemented in hardware, as in some embodiments, system components can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Software components may comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In addition, the scope of the present disclosure includes embodying the functionality of one or more embodiments in logic embodied in hardware or software-configured mediums.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

Therefore, at least the following is claimed:

1. A method for analyzing performance of an application, comprising:
    collecting performance metric data from the application over time;
    segmenting the performance metric data into time segments representing sets of contiguous time samples which exhibit similar performance metric behavior, wherein each of the time segments relates to a period of different behavior within the performance metric data;
    determining the presence of an anomaly in a time segment; and
    correlating the anomalous segment with other data available to the system to determine the cause of the anomaly.

2. The method of claim 1, wherein the performance metric data comprises at least one of response time, number of unavailabilities per unit of time, throughput, and hits per second.

3. The method of claim 1, wherein determining the presence of an anomaly comprises comparing a baseline state of the application with the performance metric data from a time segment to determine the presence of an anomaly in the time segment.

4. The method of claim 1, wherein determining the presence of an anomaly comprises comparing the performance metric data from a time segment with performance metric data from a past time segment to determine the presence of an anomaly in the time segment.

5. The method of claim 1, further comprising querying a database regarding changes to the application or changes to a supporting component of the application that occurred during a time segment.

6. The method of claim 1, further comprising querying a database to identify a support component of the application upon detection of an anomaly in the performance metric data from a time segment.

7. The method of claim 6, wherein the other data available to the system for correlation includes a set of performance metric data of the support component from the time segment.

8. The method of claim 1, further comprising performing a commonality analysis between a detected anomalous segment and past anomalous segments.

9. The method of claim 1, further comprising identifying a pattern in the collected performance metric data, and classifying the anomaly into a category based on the identified pattern.

10. The method of claim 9, further comprising projecting trends in the identified pattern to identify future anomalies.

11. A computer readable storage medium comprising a program for analyzing performance of an application, the program when executed by a computer processor causing the processor to perform the steps of:
    collecting performance metric data from the application;
    segmenting the performance metric data into time segments representing sets of contiguous time samples which exhibit similar performance metric behavior, wherein each of the time segments relates to a period of different behavior within the performance metric data;
    determining the presence of an anomaly in a time segment; and
    correlating the performance metric data to determine the cause of the anomaly.

12. A system for analyzing performance of an application, comprising:
    an analysis module configured to collect performance metric data from the application, the analysis module further configured to identify an anomaly in one or more of time segments of the collected performance metric data;
    a segmentation engine configured to segment the collected performance metric data into time segments, representing sets of contiguous time samples which exhibit similar performance metric behavior, wherein each of the time segments relates to a period of different behavior within the performance metric data; and
    a correlation engine configured to correlate the time segments with other time-based data in the system to determine a cause of the identified anomaly.

* * * * *